July 15, 1969  A. F. SCHOTT  3,455,034

MATHEMATICS TEACHING TOOL

Filed Oct. 19, 1965

INVENTOR
ANDREW F. SCHOTT

BY Wheeler, Wheeler + Wheeler
ATTORNEYS

United States Patent Office 3,455,034
Patented July 15, 1969

---

3,455,034
MATHEMATICS TEACHING TOOL
Andrew F. Schott, Rte. 1, Green Lake, Wis. 54941
Filed Oct. 19, 1965, Ser. No. 497,631
Int. Cl. G06c 1/00
U.S. Cl. 35—33     4 Claims

ABSTRACT OF THE DISCLOSURE

This disclosure relates to a mathematical teaching tool in the form of two abaci having their head end bars hinged together so that the tool can be folded into one position in which the respective abaci are in spaced parallel relation, and unfolded into another position in which the abaci are substantially in the same plane and in mirror-image relation one to the other. The counters on one abacus denote positive signed numbers, and the counters on the other abacus represent negative signed numbers, the hinged together head end bars representing zero.

---

This invention relates to a mathematics teaching tool, and particularly to an abacus.

The mathematical teaching tool of the present invention extends the mathematical relationships taught on the abaci shown in my United States Patents 3,076,272 and 3,151,404. The mathematical concepts which the teaching tool of the present invention is adapted to expound includes sets, relations, functions and operations, and particularly the relation existing between the set of counting numbers and the system of natural numbers including the concept of the empty set (0). The teaching tool of the present invention is also adapted to teach the relationship between positive signed integers and negative signed integers, and the relationship between such integers to zero.

According to the present invention, two abaci of the type shown in my prior patents aforesaid are hingedly connected with the groups of multiple number denoting counters proximate the hinge and the groups of single number denoting counters remote from the hinge, thus to associate the counters on the respective abaci in mirror image relationship. The hinged divider between the respective abaci represents zero. The counters on one abacus represent positively signed numbers, and the counters on the other abacus represent negatively signed numbers.

Other objects, features and advantages of the invention will appear from the following disclosure in which.

Figure 1:
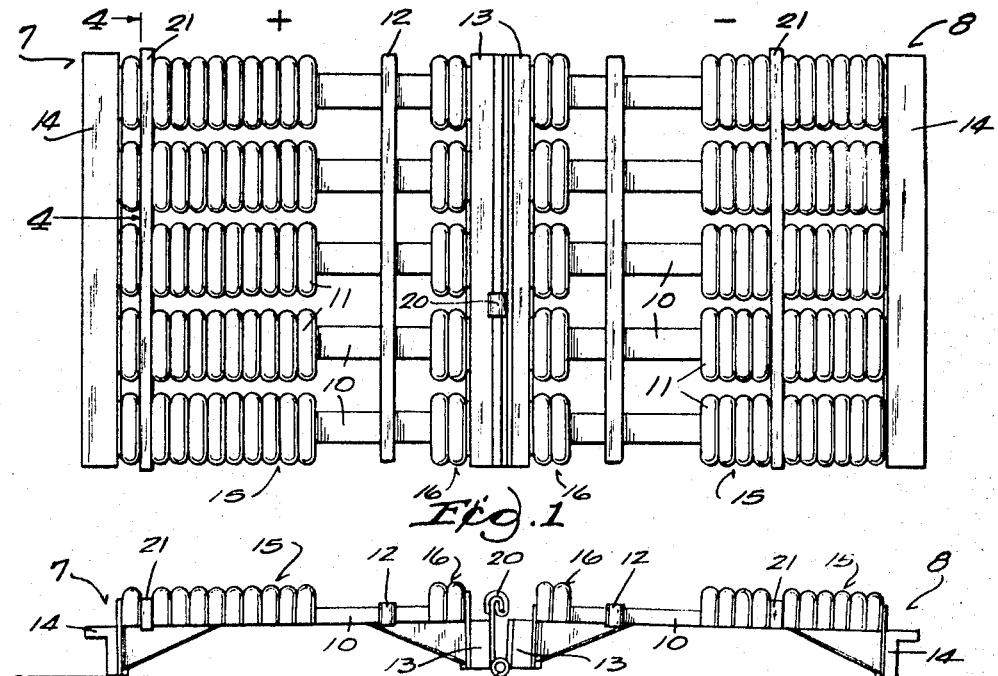
FIG. 1 is a plan view of an unfolded teaching tool embodying the present invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

According to the present invention, there is a left side abacus 7 and a right side abacus 8. The respective abaci 7, 8 are interconnected by the hinge 9. Accordingly, the abaci 7, 8 can be folded and unfolded between the positions respectively indicated in the figures.

As in my prior patents aforesaid, each abacus consists of a series of rods or columns 10 upon which sliding counters 11 are mounted.

As is shown in the prior patents aforesaid, each abacus 7, 8 is further subdivided by a fixed bar 12 which is disposed intermediate the head end bar 13 and the foot end bar 14. The series of counters between bars 12, 14 constitute a set or groups 15 of single number denoting counters. The counters 11 between the bars 12, 13 constitute a set or group 16 of multiple number denoting counters.

Figure 2:
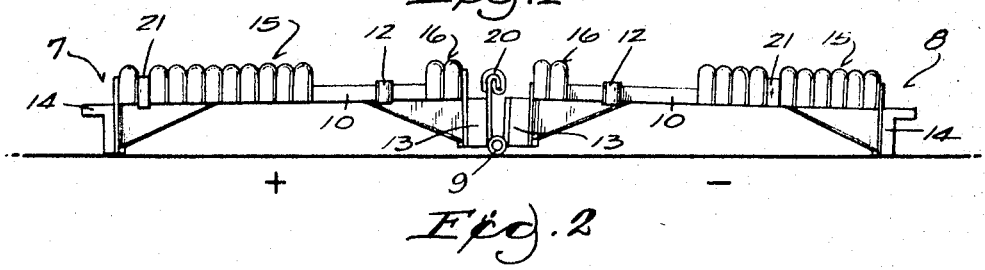
FIG. 2 is a side elevation of the unfolded tool of FIG. 1.
Figure 3:
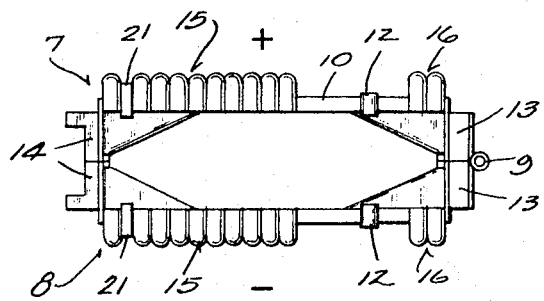
FIG. 3 is a side elevation of the teaching tool of FIG. 2 with the right side abacus folded beneath the left side abacus.
Figure 4:
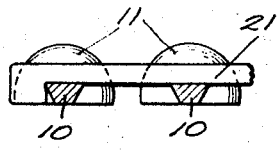
FIG. 4 is a fragmentary cross section taken along the line 4—4 of FIG. 1.

Each abacus 7, 8 can be used independently of the other, if desired, as explained in the prior patents aforesaid. However, the presence of the hinge 9 in the device of the present invention facilitates demonstration of the mirror image relationship between negatively and positively signed integers. When the teaching tool of the present invention is folded on the hinge 9 to its position shown in FIG. 3, the composite structure can be visualized as a single abacus. Note that the counters 11 are approximately half round so that corresponding counters in each abacus 7, 8 could be visualized as halves of a unitary whole counter. When the right side abacus 8 is swung from its FIG. 3 to its FIG. 2 position, this is equivalent to cutting the abacus in half, and swinging part of it into a mirror image relationship to the remaining half. This illustrates that negative integers are the mirror image of positive integers.

The dividing structure consisting of the head end bars 13 and hinge 9 are taken to represent zero. Thus the relationship existing between the set of counting numbers and the system of natural numbers, including the concept of zero between negatively and positively signed integers, is visually demonstrated.

As in my prior Patent 3,151,404, I may provide a slideable decimal point carrier 20 which can be moved to change the value of the various counters on the several rods 10.

The base of the number system for each abacus 7, 8 can be readily changed by means of the movable stops 21, shown in FIG. 1. These can simply be slipped into place among the sets 15 of counters representing single numbers. This immobilizes the counters between the movable stops 21 and the foot end bars 14, leaving only the counters between the movable stops 21 and the fixed bar 12 to be reckoned with in the computation. The sets of single number denoting counters always have one less counter than the base of the number system. Thus, to teach mathematical concepts in a number system to the base ten, the abacus will have nine counters between movable stop 21 and fixed stop 12. If it is desired to teach mathematical concepts in a number system to the base five, movable stop 21 will be interposed in the single number denoting sets 15 so that there are only four counters 11 between movable stop 21 and the fixed stop 12.

The mobility of the movable stops 21 thus permits the movable stop in the left side abacus 7 to be positioned differently from the movable stop 21 in the right side abacus 8. Accordingly, one abacus can be set up to compute to a number system of one base, and the other abacus can be set up to compute to a number system of a different base. Thus the relationship between the various number systems to different bases can readily be discerned, and the ramifications thereof can be visualized physically as well as mentally.

From the foregoing, it is clear that the union of the sets of positive and negative integers and the set zero to form the field of numbers called the integers are easily demonstrated and the operations (plus, times, minus and divide) for the set of integers are developed. The intuitive logical axiomatic system built into the mathematical teaching tool of the present invention is thus made the basis for the establishment of formal logical systems of numbers through the rational numbers, on the basis of their properties, definitions and axiomatic development inherent in the structure of the device of the present invention.

I claim:
1. A mathematics teaching tool comprising right and left abaci each having a head end bar and a foot end bar, divider means including a hinge interconnecting the head end bars of the respective abaci together to dispose them in mirror image relation, one of said abaci comprising counters representing positively signed numbers and the other said abaci representing negatively signed numbers, each said abaci being divided by a divider bar into a set of multiple number denoting counters and a set of single number denoting counters, the respective sets of multiple number denoting counters being proximate said divider means and the respective sets of single number denoting counters being remote from said divider means.

2. The tool of claim 1 in combination with movable bar stops selectively received within the sets of single number denoting counters to change the base of the number system of the counters.

3. A mathematics teaching tool comprising two abaci in complementary laterally spaced parallel relation, each said abacus having corresponding laterally aligned columns and counters and corresponding laterally aligned head end bars and foot end bars for demonstration of mathematical relations by moving the counters toward and away from the head end bars and foot end bars, a hinge connecting said abaci and about which said abaci may swing to a position in which both abaci are in substantially the same plane and in mirror-image relating to one another with their head end bars proximate each other and their foot end bars remote from each other, each abacus being divided by a divider bar into a set of multiple number denoting counters and a set of single number denoting counters, said divider bars being closer to the head bars than to the foot end bars and being laterally aligned when the abaci are in laterally spaced relation.

4. The mathematics teaching tool of claim 3 in which the counters in one abacus represent positively signed numbers and the counters in the other abacus represent negatively signed numbers and the respective head end bars repersent zero when the abaci are swung to their mirror-image position in which they are disposed in substantially the same plane.

References Cited

UNITED STATES PATENTS

| | | | |
|---|---|---|---|
| 232,482 | 9/1880 | Fitch | 35—33 |
| 826,732 | 7/1906 | Monachimoff | 35—33 |
| 2,646,631 | 7/1953 | Lazar | 35—33 |
| 3,151,404 | 10/1964 | Schott | 35—33 |

WILLIAM H. GRIEB, Primary Examiner

EUGENE R. CAPOZIO, Assistant Examiner